(12) United States Patent
Ji et al.

(10) Patent No.: US 8,081,209 B2
(45) Date of Patent: Dec. 20, 2011

(54) METHOD AND SYSTEM OF SPARSE CODE BASED OBJECT CLASSIFICATION WITH SENSOR FUSION

(75) Inventors: Zhengping Ji, Lansing, MI (US); Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 800 days.

(21) Appl. No.: 12/147,001

(22) Filed: Jun. 26, 2008

(65) Prior Publication Data

US 2009/0322871 A1   Dec. 31, 2009

(51) Int. Cl.
*H04N 7/18* (2006.01)
*G06F 15/16* (2006.01)

(52) U.S. Cl. ........................................ 348/115
(58) Field of Classification Search ........... 348/113–118
See application file for complete search history.

(56) References Cited

U.S. PATENT DOCUMENTS

| | | | |
|---|---|---|---|
| 5,963,653 A | 10/1999 | McNary et al. | |
| 6,834,232 B1 | 12/2004 | Malhotra | |
| 6,856,873 B2 | 2/2005 | Breed et al. | |
| 6,862,537 B2 | 3/2005 | Skrbina et al. | |
| 6,885,968 B2 | 4/2005 | Breed et al. | |
| 6,889,171 B2 | 5/2005 | Skrbina et al. | |
| 7,049,945 B2 | 5/2006 | Breed et al. | |
| 7,069,130 B2 | 6/2006 | Yopp | |
| 7,085,637 B2 | 8/2006 | Breed et al. | |
| 7,110,880 B2 | 9/2006 | Breed et al. | |
| 7,202,776 B2 | 4/2007 | Breed | |
| 7,209,221 B2 | 4/2007 | Breed et al. | |
| 7,295,925 B2 | 11/2007 | Breed et al. | |
| 7,343,265 B2 * | 3/2008 | Andarawis et al. | 702/188 |
| 7,359,782 B2 * | 4/2008 | Breed | 701/45 |
| 2005/0038573 A1 | 2/2005 | Goudy | |
| 2005/0273212 A1 | 12/2005 | Hougen | |
| 2007/0064242 A1 * | 3/2007 | Childers | 356/601 |
| 2007/0233353 A1 | 10/2007 | Kade | |
| 2007/0282506 A1 | 12/2007 | Breed et al. | |
| 2008/0046150 A1 * | 2/2008 | Breed | 701/45 |
| 2010/0148940 A1 * | 6/2010 | Gelvin et al. | 340/286.02 |

OTHER PUBLICATIONS

Optimal In-Place Learning and the Lobe Component Analysis; Juyan Weng and Nan Zhang.

* cited by examiner

*Primary Examiner* — Zarni Maung
(74) *Attorney, Agent, or Firm* — Gifford, Krass, Spinkle, Anderson & Citkowski, P.C.

(57) ABSTRACT

A system and method for object classification based upon the fusion of a radar system and a natural imaging device using sparse code representation. The radar system provides a means of detecting the presence of an object within a predetermined path of a vehicle. Detected objects are then fused with the image gathered by the camera and then isolated in an attention window. The attention window is then transformed into a sparse code representation of the object. The sparse code representation is then compared with known sparse code representation of various objects. Each known sparse code representation is given a predetermined variance and subsequent sparse code represented objects falling within said variance will be classified as such. The system and method also includes an associative learning algorithm wherein classified sparse code representations are stored and used to help classifying subsequent sparse code representation.

4 Claims, 5 Drawing Sheets

METHOD AND SYSTEM OF SPARSE CODE BASED OBJECT CLASSIFICATION WITH SENSOR FUSION

BACKGROUND OF THE INVENTION

1. Field of the Invention

A system and method for object classification based upon the fusion of a radar system and a natural imaging device, and a sparse code representation of an identified object.

2. Description of the Prior Art

Sensor fusion object classification systems are known and well documented. Such systems will gather information from an active and passive sensor and associate the two data to provide the user with information relating to the data, such as whether the object is a vehicle or a non-vehicle. Such an association is commonly referred to as fusion and is referred to as such herein. In operation, fusion relates to return of a natural image captured by the passive sensor with respect to the detection of an object by the active sensor. Specifically, an active sensor such as a radar system will be paired to a passive sensor such as a video camera, and the objects detected by the radar will be mapped to the video image taken by the video camera. The fusion of such data may be done using algorithms which map the radar return to the video image. The fused data may then be further processed for relevant information such as object detection and classification using some form of visual graphic imaging interpretation. However, visual graphic imaging interpretation requires sufficient memory to store the visual graphic data, and sufficient processing speed to interpret the visual data in a timely manner. For example, U.S. Pat. No. 6,834,232 to Malhotra teaches the use of multiple sensor data fusion architecture to reduce the amount of image processing by processing only selected areas of an image frame as determined in response to information from electromagnetic sensors. Each selected area is given a centroid and the center of reflection for each detected object is identified. A set of vectors are determined between the centers of reflection and the centroid. The difference between the centers of reflection and the centroids are used to classify objects. However, Malhotra does not teach the use of orientation selective filters for object classification.

U.S. Pat. No. 6,889,171 to Skrbina et al. discloses a system fusing radar returns with visual camera imaging to obtain environmental information associated with the vehicle such as object classification. Specifically, a radar is paired with a camera and the information received from each are time tagged and fused to provide the user with data relating to object classification, relative velocity, and the like. This system requires the data to be processed through an elaborate and complicated algorithm and thus requires a processor with that ability to process a tremendous amount of data in a relatively short period of time in order to provide the user with usable data.

U.S. Pat. No. 7,209,221 to Breed et al. discloses a method of obtaining information regarding a vehicle blind spot using an infrared emitting device. Specifically, the method uses a trained pattern recognition technique or a neural network to identify a detected object. However, Breed et al. is dependent upon the trained pattern recognition technique whereby the amount of patterns and processes may place a huge burden on the system.

Accordingly, it is desirable to have a system for object classification which does not require the amount of processing capabilities as the prior art, and which can refine and improve its classification over time. One form of object recognition and classification is known as sparse code representation. It is understood that sparse coding is how the human visual system efficiently codes images. This form of object recognition produces a limited response to any given stimulus thereby reducing the processing requirements of the prior art systems. Furthermore, the use of sparse code recognition allows the system to be integrated with current systems having embedded radar and camera fusion capabilities.

SUMMARY OF THE INVENTION AND ADVANTAGES

A system and method for object classification based upon the fusion of a radar system and a natural imaging device using sparse code representation is provided. Specifically, a radar system is paired with a camera. The radar system provides a means of detecting the presence of an object within a predetermined path of a vehicle. Objects identified within this predetermined path are then fused with the image gathered by the camera and the detected image is provided to the user in separate windows referred to hereafter as "attention windows." These attention windows are the natural camera image of the environment surrounding the radar return. The attention window is then transformed into a sparse code representation of the object. The sparse code representation is then compared with known sparse code representation of various objects. Each known sparse code representation is given a predetermined variance and subsequent sparse code representations falling within said variance will be classified as such. For instance, a known sparse code representation having a value of Y will be given a variance of $Y+/-V$, and subsequent sparse code representations of an image of an object falling within $Y+/-V$, will be classified as the object with Y. The system and method also includes an associative learning algorithm wherein classified sparse code representations are stored and used to help classifying subsequent sparse code representation, thus providing the system with the capabilities of associative learning.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
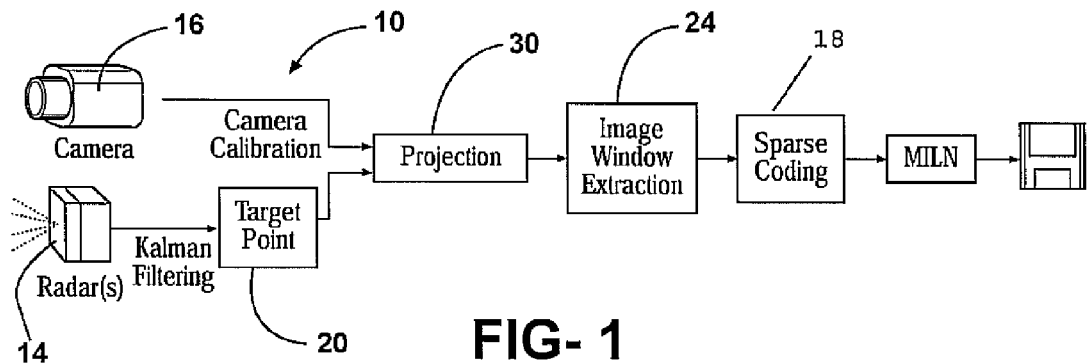
FIG. 1 is schematic of the operational architecture of the system.

With reference to FIG. 1, a system 10 and method 12 for object classification based upon the fusion of a radar system 14 and a natural imaging device 16 using sparse code representation 18 is provided. Specifically, the system 10 fuses radar return 20 with associated camera imaging 22, and the fused data 24 is then transformed into a sparse code representation 18 and classified. The camera image of the radar return 20 is isolated, extracted and filtered with the help of orientation-selective filters 26. Processing of local receptive fields embedded onto the extracted image by orientation-selective filters 26 results in a sparse code for the image. The sparse code representation 18 of the object on the image is compared to known sparse code representations 18 of a particular object class. The processing and comparison of any subsequent sparse code representation 18 of images is done in an associative learning framework.

Thus, the video image of the object detected by the radar system 14 is transformed to a sparse code representation 18, wherein the sparse code representation 18 of the detected object is used for higher-level processing such as recognition or categorization. A variety of experimental and theoretical studies indicate that the human visual system efficiently codes retinal activation using sparse coding, thus for any given stimulus there are only a few active responses. Accordingly, sparse coding representation is more independent than other forms of imaging data. This feature allows object learning and associative learning using sparse code representation 18 to become a compositional problem and improves the memory capacity of associative memories. For illustrative purposes, the system 10 described will classify an object as being either a vehicle or a non-vehicle. However it is anticipated that the object classification system 10 is capable of making other sub classifications. For example, if an object is classified as a non-vehicle, the system 10 may further classify the object as being a human, or an animal such as a deer; likewise, if the system 10 classifies an object as being a vehicle, the system 10 can further classify the object as being a motorcycle, bike, or an SUV.

In the first preferred embodiment of the system 10 for object classification, a radar system 14 is paired with a video camera for use in an automobile. Thus the specifications and characteristics of the radar system 14 must be suitable for detecting objects within the customary driving environment of an automobile. The specifications of a suitable radar system 14 includes a range between 2 to 150 m with a tolerance of either +/−5% or +/−1.0 m; an angle of at least 15 degrees, with a tolerance of either +/−0.3 degrees or +/−0.1 m, and a speed of +/−56 m/s with a tolerance +/−0.75 m/s. An example of a radar system 14 having the qualities described above is the F10 mM-Wave radar. The video camera characteristics and specifications of the video camera paired with such a radar system 14 includes a refreshing rate of 15 Hz, a field view of 45 degrees, and a resolution of 320*240 pixels. An example of a video camera system 16 having the qualities described above is a Mobileye camera system 10.

In operation, the radar system 14 provides a return for objects detected within 15 degrees and out to 150 meters of the path of the vehicle. The radar return 20 can be processed temporally to determine the relative speed of each object. As the object classification system 10 is directed at classifying objects within the path of the vehicle, radar returns 20 outside of a predetermined parameter will be discarded. This has the benefit of reducing subsequent process computational loads of the system 10 thereby increasing the efficiency of said system 10. For instance, radar returns 20 more than eight meters to the right or left of the vehicle may be discarded as the object is considered out of the vehicle's path. However, it is understood that the parameters for discarding radar returns 20 disclosed above are for illustrative purposes only and are not limiting to the disclosure presented herein.

The radar returns 20 are fused with the real-time video image provided by the video camera system 16. Specifically, the radar returns 20 are projected onto an image system reference plane 10 using a perspective mapping transformation 28. Thus, a processor 30 is provided for fusing the radar return 20 with the real-time visual of the natural imaging device 16 using an algorithm which performs the necessary perspective mapping transformation 28. The perspective mapping transformation 28 is performed using calibration data that contain the intrinsic and extrinsic parameters of each camera. An example of such a perspective mapping transformation 28 can be found in U.S. Patent No. to Skrbina et al.

Figure 2:
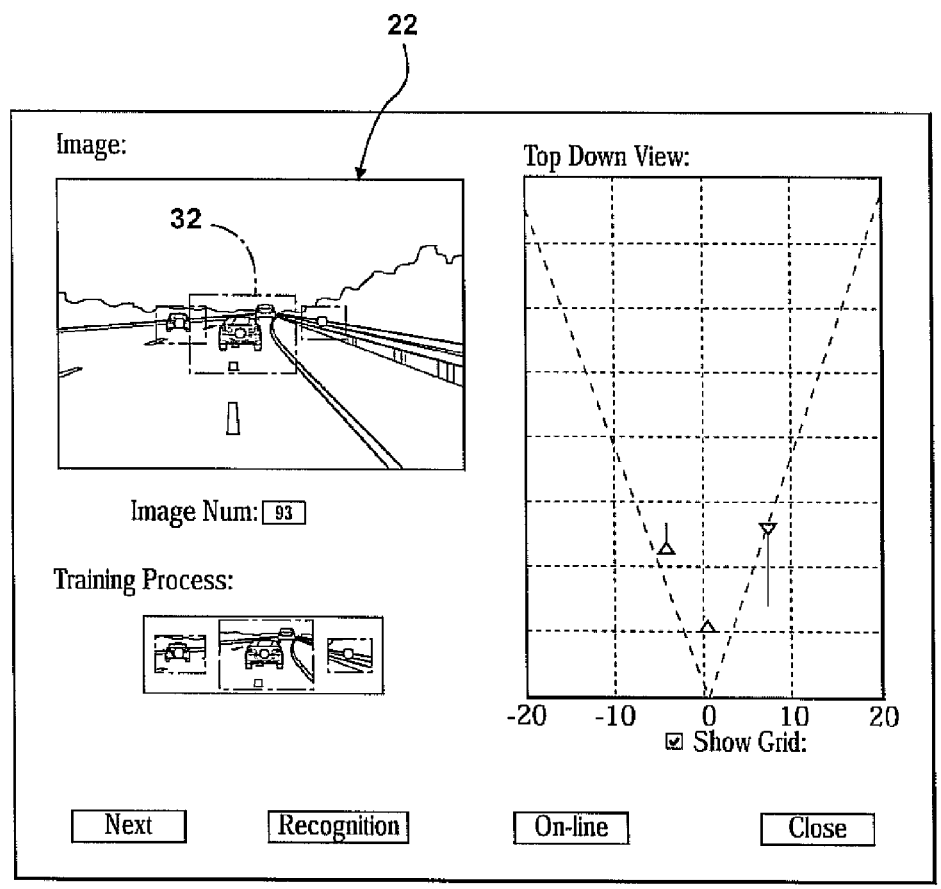
FIG. 2 is schematic of the system development interface.

With reference to FIG. 2, attention windows 32 are created for each radar return 20. The attention windows 32 are the video images of the radar return 20, and will be given a predetermined size for which to display the detected object. Specifically, as each radar return 20 is fused with the video camera image, the environment surrounding the radar returns 20 is shown in an isolated view referred to as attention windows 32. The video image of each attention window 32 correlates to the expected height and width of the detected object. Accordingly, if the system 10 is concerned with only classifying the object as either a vehicle or non-vehicle, the video image presented in each attention window 32 is designed to the expected height of a vehicle. However, as stated above the system 10 can be used to provide a broad possibility of classifications and thus the dimensions of the video images contained within the attention window 32 will be tailored accordingly.

Figure 3:
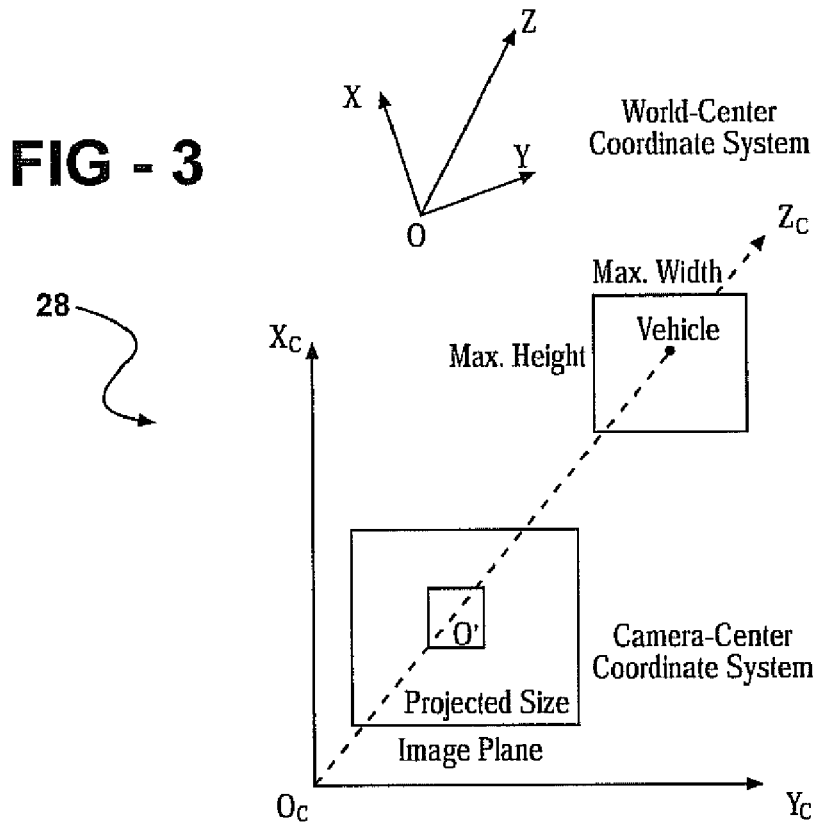
FIG. 3 shows the projection from the actual vehicle size to the window size in the image plane.

With reference to FIG. 3, the attention windows 32 provide an extracted image of the detected object from the video camera. As the video images are designed to capture the predetermined area surrounding the object as described above, each video image may differ in size from one another depending upon the distance between the detected object and the vehicle. These images are normalized within the attention window 32 to prevent the video images from being deformed. FIG. 2, shows normalized images within its respective attention window 32 wherein the pixel intensity of each attention window 32 unoccupied by an image are set to intensities of zero.

Figure 4:
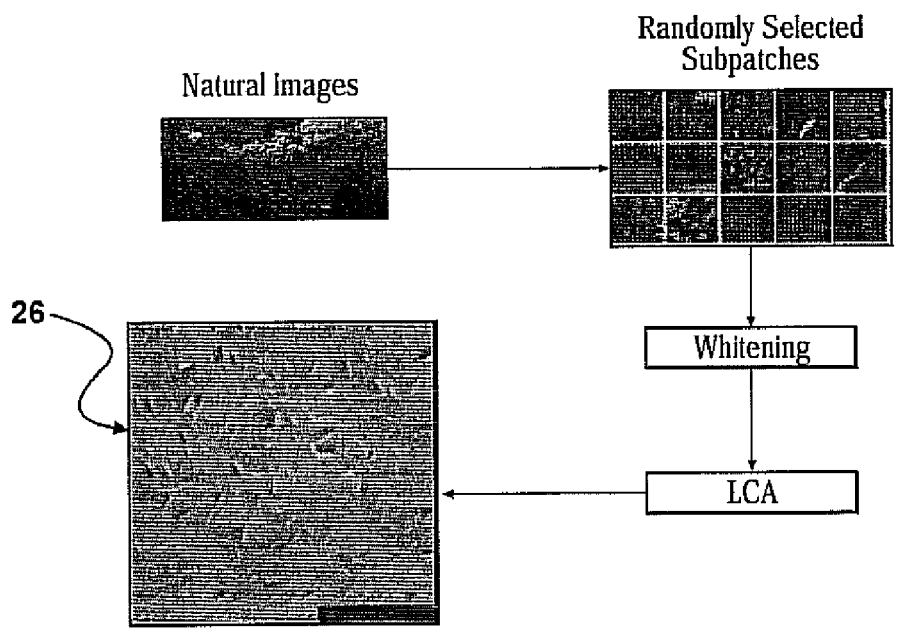
FIG. 4 shows the generation of orientation-selective filters using Lobe Component Analysis.

With reference now to FIG. 4, the generation of orientation-selective filters 26 is provided. In the preferred embodiment, the generation of orientation-selective filters 26 is achieved using Lobe Component Analysis hereafter ("LCA"). Specifically, neuron layers are developed from the natural images using LCA wherein the neurons with update totals less than a predetermined amount are discarded and the neurons with an update total of a predetermined amount or more (winning neuron) are retained. The retained (winning) neurons are then used as orientation-selective filters 26.

Figure 6:
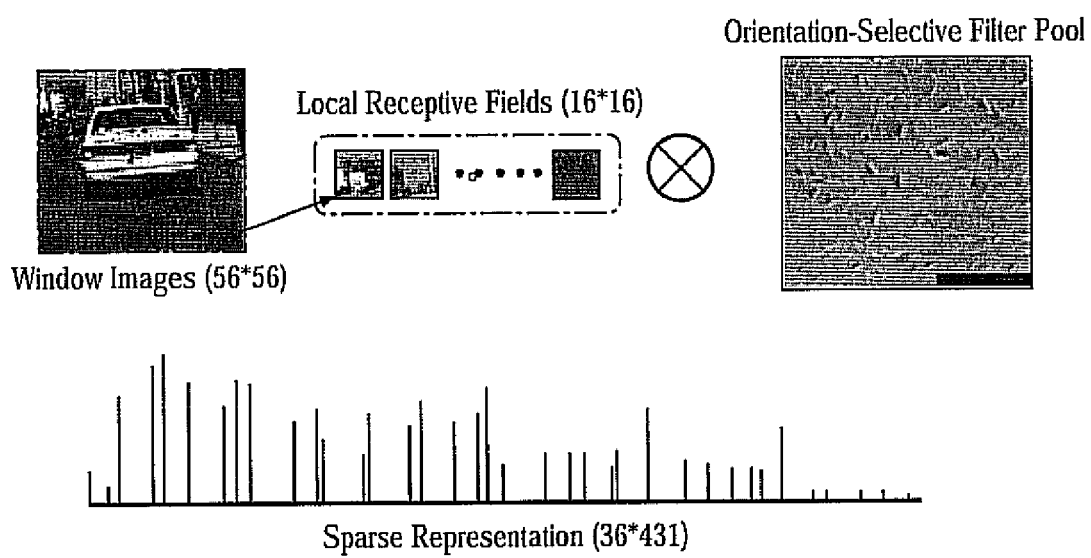
FIG. 6 shows the transformation of the natural image into a sparse code representation.

As shown in FIG. 6, a pool of orientation-selective filters 26 may be developed to provide a specimen for which subsequent classification of objects may be made. The developed filter pool is comprised of winning neurons as derived from the video image of an example of an object as captured within each attention window 32. For instance, the developed filter pool may consist of winning neurons from hundreds of natural images that have been processed through the LCA. The developed filter pool is then embedded into the system 10 to provide the system 10 with a basis for subsequent generation of sparse codes for object classifications.

Before images are processed by the LCA (FIG. 4), they are whitened. Whitening of images is a well known statistical preprocessing procedure which is intended to decorrelate images. In the preferred embodiment, whitening is achieved by selecting a predetermined area x of each attention window 32, from a predetermined number N of random locations (randomly selected patches in FIG. 4), where the predetermined area x is further defined by an area of pixels d, and $d = P_{length} \times P_{width}$. The attention window 32 is thereby related in matrix form whereby x is the attention window 32, and $x=\{x_1, x_2, \ldots x_n\}$. Each $x_n$ is further represented in vector form $x_i=(x_i, x_i, \ldots x_{i,d})$. The whitening matrix W is generated by taking the matrix of principal components $V=\{V_1, V_2, \ldots V_k\}$ and dividing each by its standard deviation (the square root of variance). The matrix D is a diagonal matrix where the matrix element at row and column i is $$\frac{1}{\sqrt{\lambda_i}}$$

and $\lambda_I$ is the eigenvalue of $v_i$. Then, W=VD. To obtain a whitened attention window 32 Y, multiply the response vector(s) X by W: Y=WX=VDX. However, the image can be transformed into a sparse code representation 18 without whitening.

Upon obtaining whitened attention window 32 Y, Y is further processed to develop neuron layers through the LCA algorithm. The LCA algorithm incrementally updates c of corresponding neurons represented by the column vectors $v_1^{(t)}, v_2^{(t)}, \ldots v_c^{(t)}$ from whitened input samples y, y(1), y(2), … y(i), where y(i) is a column vector extracted from the Matrix Y. At time t, the output of the layer is the response vector $z(t)=(z_1(t), z_2(t), \ldots z_c(t))$. The LCA Algorithm z(t)=LCA(y(t)) is as follows:

ALGORITHM 1

Lobe Component Analysis

1:
    Sequentially initialize c cells using first c observations:
    $v_t^{(c)} = y(t)$ and set cell-update age n(t) = 1, for t = 1, 2, …, c.
2:
    for t = c + 1, c + 2, … do
3:        Compute output (response) for all neurons:
4:        for $1 \leq i \leq c$ do
5:        Compute the response:

$$z_i(t) = g_i\left(\frac{y(t) \cdot v_i(t-1)}{\|v_i(t-1)\|\|y(t)\|}\right),$$

where $g_i$ is a sigmoidal function.
6:        Simulating lateral inhibition, decide the
        winner: $j = \arg\max_{1 \leq i \leq c}\{z_i(t)\}$.
7:        Update only the winner neuron $v_j$ using its
        temporally scheduled plasticity:
        $v_j(t) = w_1 v_j(t-1) + w_2 z_j y(t)$,
        where the scheduled plasticity is determined by
        its two age-dependent weights:

$$w_1 = \frac{n(j) - 1 - \mu(n(j))}{n(j)}, \quad w_2 = \frac{1 + \mu(n(j))}{n(j)},$$

with $w_1 + w_2 = 1$. Update the number of hits
        (cell age) n(j) only for the winner: $n(j) \leftarrow n(j) + 1$.

$$\mu(\eta_j) = \begin{cases} 0 & \text{if } \eta_j \leq t_1, \\ c(\eta_j - t_1)/(t_2 - t_1) & \text{if } t_1 < \eta_j \leq t_2, \\ c + (\eta_j - t_1)/r & \text{if } t_2 < t, \end{cases}$$

Where plasticity parameters $t_1 = 20$, $t_2 = 200$, c = 2, and
    r = 2000 in our implementation.
8:        All other neurons keep their ages and weight
        unchanged: For all $1 \leq i \leq c$, $i \neq j$, $v_i^{(t)} = v_i^{(t-1)}$.
9:
    end for
10:
end for FIG. 4 shows the result when using LCA on neurons ("c") and whitened input samples ("n"). Each neuron's weight vector is identical in dimension to the input, thus is able to be displayed in each grid as a row and column image by applying a de-whitening process, which is achieved by restoring the original input vector using the following equation: $x=VD^{-1}\hat{x}$. In FIG. 4, the lobe component with the most wins is at the top left of the image grid progresses through each row to the lobe component with the least wins, which is located at the bottom right. As stated before, the neurons having at least a predetermined amount of wins (update totals) were kept because said neurons showed a localized orientation pattern. Accordingly, the retained winning neurons are designated as orientation-selective filters 26. Thus, as the real world image samples are collected and processed through the above described LCA, the winning neurons are kept and designated as orientation-selective filters 26 and used for further processing. The benefit of using orientation-selective filters 26 is that said orientation-selective filters 26 eliminate reliance upon problem domain experts, and traditional image processing methods 12.

Figure 5:
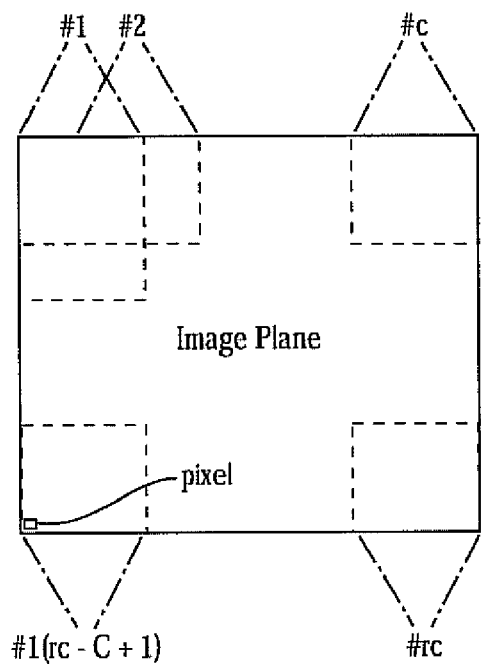
FIG. 5 shows the arrangement of local receptive fields over the attention window.

With reference to FIG. 5, square receptive fields are applied over the entire attention window 32 such that some of the receptive fields overlap each other. Each receptive field has a predetermined area defined by pixel length and width. In the preferred embodiment, these receptive fields are pixels in the attention window 32 image plane. FIG. 5 shows each receptive field staggered from each other by pixels, and in an overlapping relationship. In this manner a plurality of local receptive fields are held within the attention window 32 plane.

With reference to FIG. 6, the orientation-selective filter 26 may be transformed into sparse code representation 18 S by taking orientation-selective filters 26 F transposed and multiplying it by a non-negative matrix L, where L represents the local receptive fields as shown in the following equation $S=F^T \times L$. Each receptive field is represented by a stacked vector having a correlating pixel length and width. Accordingly, in the preferred embodiment, the stacked vector dimension is x. Thus, a non-negative matrix L is provided, where $L=\{I_1, I_2, \ldots I_m\}$ and m is the number of local receptive fields. The set of orientation-selective filters 26 are represented as $F=\{f_1, f_2, \ldots f_{c'}\}$ where c' represents the number of neurons retained from the win selection process, and each $f_i$ is a non-negative orientation-selective filter 26 from neuron i represented as $f_i=(f_i, f_i, \ldots f_{i,d})$, where d=16×16.

As represented by the S equation above, the orientation-selective filters 26 are multiplied by the local receptive fields to generate sparse representation of the image. The matrix S is non-negative and, by operation of the formula $S=F^T \times L$, is reshaped into a vector having a total number of dimension i×m, and i represents the total number of neurons kept from the winning process of FIG. 4, and in represents the total number of local receptive fields. Thus, matrix S maps the raw pixel representation of the attention window 32 to a higher dimensional, sparse encoded space which leads to a sparse code representation 18 of the input as opposed to the standard pixel representation of the image. The sparse code representation 18 has the advantage of achieving better efficiency in both recognition rate and learning speed than classification methods 12 based upon the original pixel input, or image based classification systems 10 using image recognition.

An associative learning framework such as Multi-layer In-place Learning Network (MILN), Neural Network (NN), Incremental Support Vector Machines (I-SVM), or Incremental Hierarchical Discriminant Regression, is then used to classify the sparse code representation 18 of the input. The associative learning framework utilizes both incremental and online learning methods 12 to recognize and classify inputs. Accordingly, the use of a developed filter pool enhances the system 10 due to the various known properties of objects provided. However, the advantage of the associative learning framework is that the system 10 can make subsequent object classification based upon a developed filter pool having only one sparse code representations 18 of each object within a particular classification. For example, where the system 10 only makes two object classifications, vehicle or non-vehicle, a sparse code representation 18 of a vehicle and a non-vehicle will allow the system 10 to make subsequent object classifications based upon the two known sparse code representations. In the preferred embodiment, the MILN is used as it provides better performance.

A comparative study of four different classification methods was conducted where each method was used in an open-ended autonomous development where an efficient (memory controlled), real-time (incremental and timely), and extendable (the number of classes can increase) architecture is desired. Tables showing the results of the study are provided for reference. The four different classification methods are: K-Nearest Neighbor ("NN"), with k=1, and using a L1 distance metric for baseline performance, Incremental-SVM ("I-SVM"), Incremental Hierarchical Discriminant Regression (IHDR) and the MILN as discussed herein. A linear kernel for I-SVM was used for high-dimensional problems. A summary of the results of the comparative study using two different input types: non-transformed space, "pixel" space having input dimensions of 56×56; and sparse-coded space having dimensions of 36×431 by the MILN Layer-1 are provided in the Tables 1 and 2. Table 1 shows the average performance of learning methods over 10-fold cross validation for pixel inputs and Table 2 shows average performance of learning methods over 10-fold cross validation for sparse coded inputs.

The study shows that the Nearest Neighbor performed fairly well, but was prohibitively slow. IHDR performed faster than NN, but required a lot of memory as IHDR automatically develops an overlaying tree structure that organizes and clusters data. Furthermore, while IHDR does allow sample merging, it saves every training sample thus does not use memory efficiently. I-SVM performed well with both types of input, and uses the least memory, in terms of the number of support vectors automatically determined by the data, but training time is the worst. Another potential problem with I-SVM is its lack of extendibility to situations when the same data may be later expanded from the original two to more than two classes. As general purpose regressors, IHDR and MILN are readily extendable. IHDR uses too much memory and does not represent information efficiently and selectively as shown in tables 1 and 2. The MILN however, allows the system to focus analysis on sub-parts of the attention window to improve generalization (e.g., recognize a vehicle as a combination of license plate, rear window and two tail lights). Table 2 shows that the overall accuracy of object classification is more accurate using MILN when using sparse coded inputs.

TABLE 1

AVERAGE PERFORMANCE & COMPARISON OF LEARNING METHODS OVER 10-FOLD CROSS VALIDATION FOR PIXEL INPUTS

| Learning Method | "Overall" Accuracy | "Vehicle" Accuracy | "Other Objects" Accuracy | Training Time Per Sample | Test Time Per Sample | Final # Storage Elements |
|---|---|---|---|---|---|---|
| NN | 93.89 ± 1.84% | 94.32 ± 1.42% | 93.38 ± 2.04% | N/A | 432.0 ± 20.3 ms | 621 |
| I-SVM | 94.38 ± 2.24% | 97.08 ± 1.01% | 92.10 ± 6.08% | 134.3 ± 0.4 ms | 2.2 ± 0.1 ms | 44.5 ± 2.3 |
| I-HDR | 95.87 ± 1.02% | 96.36 ± 0.74% | 95.62 ± 2.84% | 2.7 ± 0.4 ms | 4.7 ± 0.6 ms | 689 |
| MILN | 94.58 ± 2.34% | 97.12 ± 1.60% | 91.20 ± 5.31% | 8.8 ± 0.6 ms | 8.8 ± 0.6 ms | 100 |

TABLE 2

AVERAGE PERFORMANCE & COMPARISON OF LEARNING METHODS OVER 10-FOLD CROSS VALIDATION FOR SPARSE CODED INPUTS

| Learning Method | "Overall" Accuracy | "Vehicle" Accuracy | "Other Objects" Accuracy | Training Time Per Sample | Test Time Per Sample | Final # Storage Elements |
|---|---|---|---|---|---|---|
| NN | 94.32 ± 1.24% | 95.43 ± 1.02% | 91.28 ± 1.86% | N/A | 2186.5 ± 52.5 ms | 621 |
| I-SVM | 96.79 ± 1.17% | 97.23 ± 1.20% | 99.40 ± 3.27% | 324.5 ± 22.4 ms | 7.6 ± 0.3 ms | 45.2 ± 2.6 |
| I-HDR | 96.54 ± 1.83% | 96.79 ± 1.04% | 96.31 ± 2.05% | 12.2 ± 1.3 ms | 21.5 ± 1.7 ms | 689 |
| MILN | 97.14 ± 1.27% | 97.93 ± 1.63% | 95.46 ± 2.54% | 109.1 ± 3.2 ms | 42.6 ± 0.4 ms | 100 |

Figure 7:
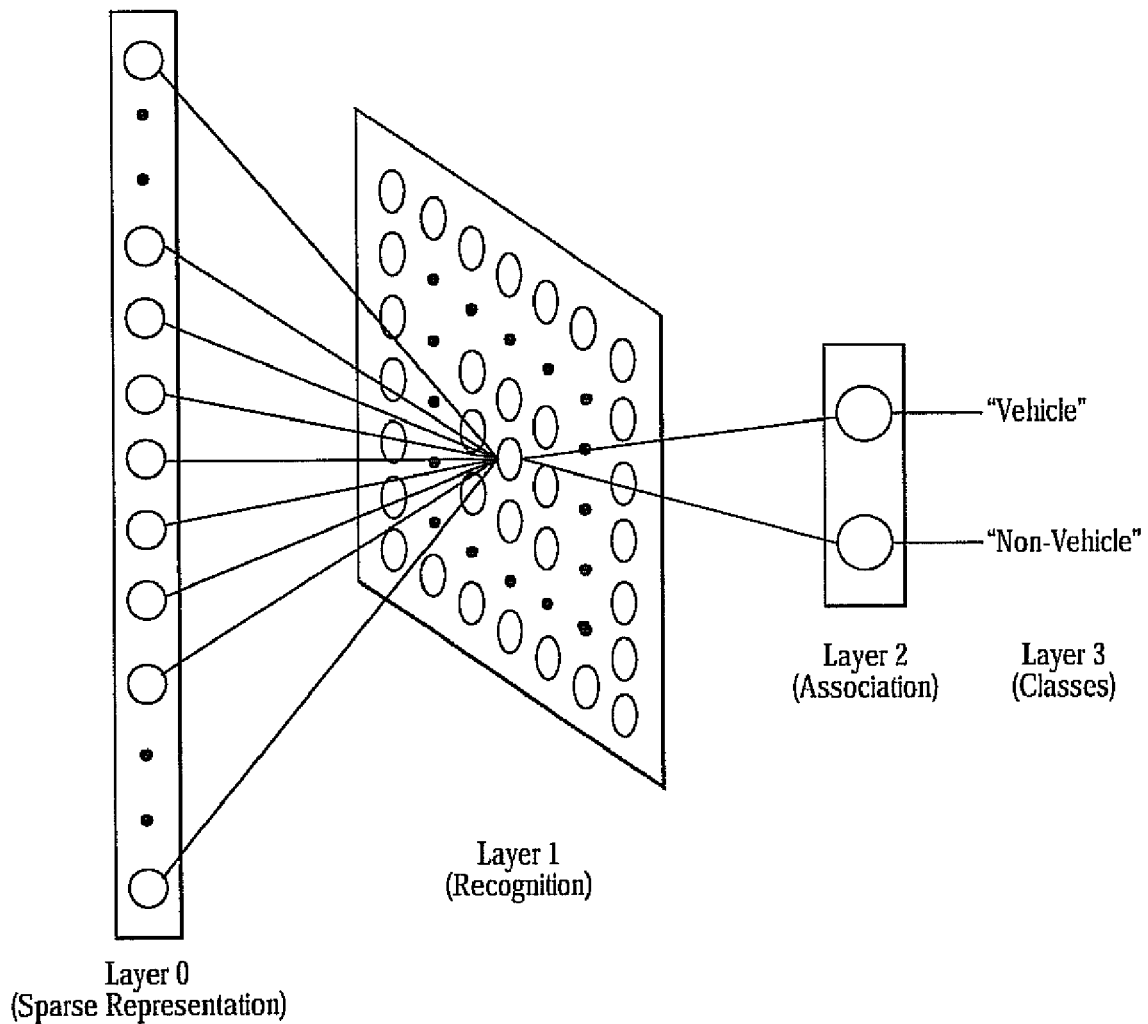
FIG. 7 shows the placement of neurons on different levels in the network.

The generated sparse code representations 18 are processed through the MILN. The advantage of a MILN is that there are no global rules for learning, such as the minimization of mean square error for a pre-collected set of inputs and outputs. Thus with MILN, each neuron learns on its own, as a self-contained entity using its own internal mechanisms. As shown in the algorithm 2, a Top-Down input is provided. Initially, the Top-Down input is an external signal that is labeled as being in a particular classification. Subsequent signals gathered from the systems sensors are then compared with the initial signal for classification. The mechanisms contained in the MILN along with each neuron's stimulation affect the neuron's features over time thus enabling a learning process. As shown in FIG. 7, the MILN network includes two layers to perform learning, a first layer which recognizes the sparse code representation 18, and a second layer which associates the recognized layer with the classes. Obviously, additional layers may be provided for further classifying the input in each class into sub-classes. In operation, the inputs are processed through the following algorithm which classifies the sparse code representations 18 into predetermined categories:

ALGORITHM 2

MILN

1:  For l = 1, ... L − 1, set the output at layer l at time t = 0 to be $z_l = 0$ where 0 denote a zero vector.
    Initialize $w_{b,j}^1(1) = s(i)$ for all neurons of the first layer.
2:  for t = 1, 2, ... do
3:      Grab the current sensory input s(t) and imposed output (teaching signal) m(t).
4:      $z_L(t) = m(t);$
5:      $y(t) = s(t);$
6:      for l = 1 ..., L − 1 do
7:          Top-down input $e(t) = z_{l+1}(t); w_{t,i}^l(t) = w_{b,j}^{l+1}(t)$ for all i and j linked together.
8:          for $1 \leq i \leq c$ do
9:              Compute pre-response of neuron i from bottom-up and top-down input connections as:

$$z_{l,j} = g_i\left((1-\alpha_l)\frac{w_{b,i}^l(t) \cdot y(t)}{\|w_{b,i}^l(t)\|\|y(t)\|} + \alpha_l \frac{w_{t,i}^l(t) \cdot e(t)}{\|w_{t,i}^l(t)\|\|e(t)\|}\right)$$

where the weight $\alpha_l$ is within {0 1} and is layer specific, $g_i$ is a sigmoidal function or its piecewise linear approximation.
110:        Simulating lateral inhibition, decide the winner: $j = \arg\max_{1 \leq i \leq c}\{z_{l,i}(t)\};$
111:        For l = 1, the 3 × 3 cells neighboring j are also considered as winners and added to the winner set J.
112:        Only the neurons from J that have a nonzero response are to be updated in the next step.
113:        Update each neuron j in the winner set J using its temporally scheduled plasticity:
            $w_{b,i}^l(t) = w_1 w_{b,i}^l(t-1) + w_2 z_{l,j} y(t),$
            where the scheduled plasticity is determined by its two age-dependent weights:

$$w_1 = \frac{n(j) - 1 - \mu(n(j))}{n(j)},$$

$$w_2 = \frac{1 + \mu(n(j))}{n(j)},$$

with $w_1 + w_2 \equiv 1$. Update the number of hits (cell age) n(j) only for the winner: $n(j) \leftarrow n(j) + 1$.
114:        All other neurons keep their ages and weight unchanged:
            For all $1 \leq i \leq c$, $i \notin J$, $w_{b,i}^l(t) = w_{b,i}^l(t-1)$.
115:        end for
116:        $y(t) = z_l(t);$
117:    end for
118: end for The MILN algorithm takes sparse code representation 18 of inputs and classifies the input in accordance with already classified sparse code representation 18 of images stored within the system 10. As more subsequent sparse code representations 18 are processed through the MILN algorithm, the features of the local receptive fields are changed such that the system 10 begins to associate sparse code representations 18 having a defined variance with the appropriate classification. Thus, the system is able to learn and classify with greater accuracy as more inputs are processed.

Figure 8:
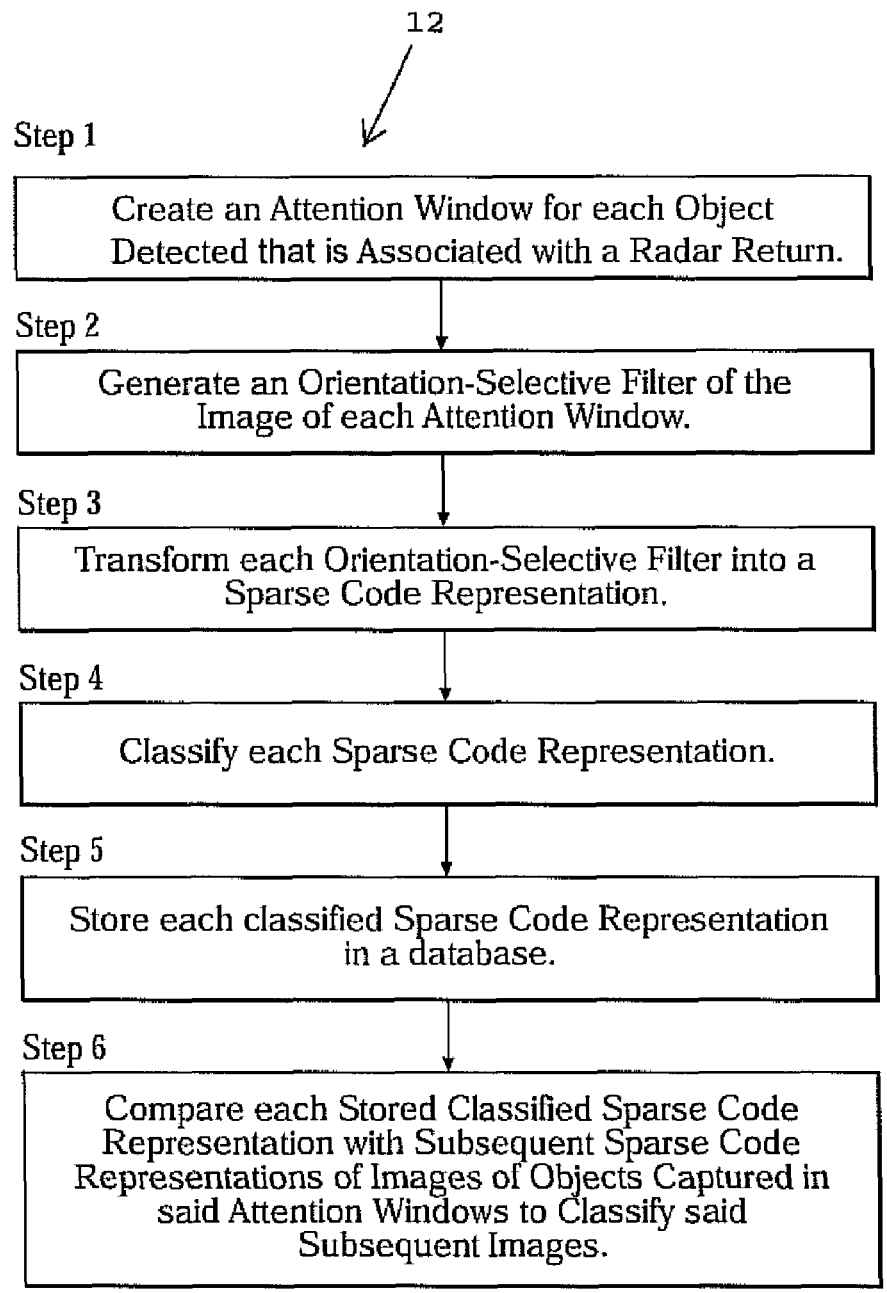
FIG. 8 shows the method for object classification using sparse code representation.

With reference now to FIG. 8, a method of object classification based upon the fusion of a radar system and a natural imaging device is also provided. The method begins with performing a perspective mapping transformation of a return of the radar system with a real-time image from the natural imaging device. The next step is to create an attention window for each object detected by the radar, wherein the attention window has a predetermined width and height from an object and the natural image is displayed in each attention window. Orientation-selective filters are then generated based upon the images of each attention window. The orientation-selective filters are then transformed into a sparse code representation, classified, and then stored in an associative learning framework. Each stored classified sparse code representation is used to further classify subsequent sparse code representations of its respective attention window.

Obviously, many modifications and variations of the present invention are possible in light of the above teachings and may be practiced otherwise than as specifically described while within the scope of the appended claims. In addition, the reference numerals in the claims are merely for convenience and are not to be read in any way as limiting.

What is claimed is:

1. A system for object classification wherein the natural image of a radar return is isolated and processed for subsequent classification, said system comprising:
    a radar system, said radar system having a predetermined range and providing a return for the detection of an object within said predetermined range;
    a natural imaging device, said natural imaging device providing a real-time visual of the environment;
    a computer, wherein said computer executing a software program that associates said return of said radar system with the real-time visual of the natural imaging device using a perspective mapping transformation to provide an isolated natural image of said return;
    said computer further executing an algorithm for processing the image of each of at least one attention window to generate an orientation-selective filter associated with each of said at least one attention window;
    said computer further executing a sparse code generation algorithm, whereby each image of each of said at least one attention window is transformed via orientation-selective filters by said sparse code generation algorithm to provide a sparse code representation of each image; and
    an associative learning framework, whereby said associative learning framework classifies each of said sparse code representation, and said associative learning algorithm identifies subsequent sparse code representation by comparing said subsequent sparse code representation with known classifications of sparse code representation.

2. A system as set forth in claim 1 further comprising at least one attention window, each of said at least one attention window having a predetermined width and height from said return, said at least one attention window including the image of said return as captured by said natural imaging device.

3. A system as set forth in claim 1 wherein said algorithm for generating said orientation-selective filter is a lobe component analysis.

4. A method of object classification based upon the fusion of a radar system and a natural imaging device, said method comprising:
- performing a perspective mapping transformation of a return of said radar system with a real-time image from said natural imaging device,
- creating an attention window for each object detected by said radar, wherein said attention window having a pre-determined width and height from an object and the image of said object is displayed in each attention window;
- generating orientation-selective filters of the image,
- transforming said image via orientation-selective filters into a sparse code representation;
- classifying each sparse code representation;
- storing each classified sparse code representation in a database; and
- using each stored classified sparse code representation to further classify subsequent sparse code representations of subsequent images of objects captured in said attention windows.

* * * * *

UNITED STATES PATENT AND TRADEMARK OFFICE
CERTIFICATE OF CORRECTION

PATENT NO.      : 8,081,209 B2
APPLICATION NO. : 12/147001
DATED           : December 20, 2011
INVENTOR(S)     : Zhengping Ji et al.

It is certified that error appears in the above-identified patent and that said Letters Patent is hereby corrected as shown below:

In the Specification:

At column 3, line number 35 after camera, insert --16--

At column 3, line number 45 delete "mM", insert --MM--

At column 3, line number 45 after camera, insert --16--

At column 3, line number 46 after camera, insert --16--

At column 5, line number 36 delete "$\leqq i \leqq$", insert --$\leq i \leq$--

At column 5, line number 42 delete "$\leqq i \leqq$", insert --$\leq i \leq$--

At column 5, line number 60 delete "$\leqq i \leqq$", insert --$\leq i \leq$--

At column 6, line number 50 delete "in", insert --m--

At column 9, line number 19 delete "$\leqq i \leqq_c$ do", insert --$\leq i \leq_c$ do--

At column 9, line number 32 delete "$\leqq i \leqq_c$.", insert --$\leq i \leq_c$--

At column 9, line number 41 delete "$w_{b,i}^1 (t) = w_i w_{b,i}^1$", insert --$w^1_{b,i} (t) = w_i w^1_{b,i}$--

At column 9, line number 53 delete "$\leqq i \leqq$", insert --$\leq i \leq$--

Signed and Sealed this
Twenty-fourth Day of June, 2014

Michelle K. Lee
*Deputy Director of the United States Patent and Trademark Office*